(12) United States Patent
Davis et al.

(10) Patent No.: US 8,782,602 B2
(45) Date of Patent: *Jul. 15, 2014

(54) UPDATING A WORKFLOW WHEN A USER REACHES AN IMPASSE IN THE WORKFLOW

(75) Inventors: Matthew Scott Davis, Durham, NC (US); David Robert Draeger, Rochester, MN (US); Russell Blake Wright, Bar Harbor, ME (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,846

(22) Filed: Sep. 14, 2012

(65) Prior Publication Data

US 2013/0014116 A1 Jan. 10, 2013

Related U.S. Application Data

(63) Continuation of application No. 11/849,187, filed on Aug. 31, 2007.

(51) Int. Cl.
*G06F 9/44* (2006.01)

(52) U.S. Cl.
USPC .......................................................... 717/120

(58) Field of Classification Search
USPC .......................................................... 717/120
See application file for complete search history.

(56) References Cited

U.S. PATENT DOCUMENTS

| | | | |
|---|---|---|---|
| 5,958,003 A | 9/1999 | Preining et al. | |
| 6,601,035 B1 | 7/2003 | Panagos et al. | |
| 6,795,815 B2 * | 9/2004 | Zhang | 706/46 |
| 7,624,194 B2 | 11/2009 | Kakivaya et al. | |
| 2002/0055939 A1 * | 5/2002 | Nardone et al. | 707/104.1 |
| 2003/0028550 A1 | 2/2003 | Lee et al. | |
| 2003/0084016 A1 * | 5/2003 | Norgaard et al. | 706/60 |
| 2004/0019512 A1 * | 1/2004 | Nonaka | 705/8 |
| 2004/0133660 A1 | 7/2004 | Junghuber et al. | |
| 2004/0199881 A1 | 10/2004 | Ghosh et al. | |
| 2005/0004928 A1 * | 1/2005 | Hamer et al. | 707/100 |

(Continued)

OTHER PUBLICATIONS

Notice of Allowance 2, Nov. 13, 2012, for U.S. Appl. No. 11/849,197, filed Aug. 31, 2007 by M.S. Davis et al., Total 9 pp. [57.110 (NOA2)].

(Continued)

*Primary Examiner* — Li B Zhen
*Assistant Examiner* — Bradford Wheaton
(74) *Attorney, Agent, or Firm* — David W. Victor; Konrad, Raynes, Davda & Victor LLP (57) ABSTRACT

Provided are a method, system, and article of manufacture for updating a workflow when a user reaches an impasse in the workflow. A workflow program processes user input at a current node in a workflow and provides user input to traverse through at least one workflow path to reach the current node. The workflow program processes user input at the current node to determine whether there is a next node in the workflow for the processed user input. The workflow program transmits information on the current node to an analyzer in response to determining that there is no next node in the workflow. If there are modifications to the current node, then the analyzer transmits to the workflow program an update including the determined modifications to the current node in response to determining the modification.

16 Claims, 7 Drawing Sheets

(56) References Cited

U.S. PATENT DOCUMENTS

| | | | |
|---|---|---|---|
| 2005/0108418 A1 | 5/2005 | Bedi et al. | |
| 2005/0182749 A1 | 8/2005 | Matsui | |
| 2005/0234984 A1 | 10/2005 | Rogerson et al. | |
| 2006/0004614 A1 | 1/2006 | Hutchinson et al. | |
| 2006/0010025 A1 | 1/2006 | Sattler et al. | |
| 2006/0085412 A1 | 4/2006 | Johnson et al. | |
| 2006/0167730 A1* | 7/2006 | Calderone et al. | 705/8 |
| 2006/0190535 A1 | 8/2006 | Kaitaniemi et al. | |
| 2006/0235737 A1 | 10/2006 | Fleurant et al. | |
| 2006/0235738 A1 | 10/2006 | Doyle et al. | |
| 2006/0271927 A1 | 11/2006 | Morales et al. | |
| 2006/0277166 A1 | 12/2006 | Vogler-Ivashchanka et al. | |
| 2007/0011334 A1 | 1/2007 | Higgins et al. | |
| 2007/0011613 A1 | 1/2007 | Lane et al. | |
| 2007/0192153 A1 | 8/2007 | Toyofuku et al. | |
| 2007/0240099 A1* | 10/2007 | Jahn et al. | 717/104 |
| 2009/0064130 A1 | 3/2009 | Davis et al. | |
| 2009/0064171 A1 | 3/2009 | Davis et al. | |
| 2013/0174169 A1 | 7/2013 | Davis et al. | |

OTHER PUBLICATIONS

Feedstream Inc., "FeedStream QDoX 5.0", [online], Mar. 1, 2004, available on the Internet at <URL: http://www.feedstream.com/default/downloads/pdf/QDoX-Capabilities-Features.pdf>, 3 pp.

Office Action 1, Sep. 2, 2011, for U.S. Appl. No. 11/849,187, filed Aug. 31, 2007 by M.S. Davis et al., Total 22 pp. [57.109 (OA1)].

Vignette Corp., "Vignette Process Workflow Modeler", May 2003, 4 pp.

Yang, Y., "Enabling Cost-Effective Light-Weight Disconnected Workflow for Web-Based Teamwork Support", Journal of Applied Systems Studies, vol. 3, No. 2, 2002, pp. 437-453.

Office Action 1, Mar. 9, 2011, for U.S. Appl. No. 11/849,197, filed Aug. 31, 2007 by M.S. Davis et al., Total 16 pp. [57.110 (OA1)].

Final Office Action 1, Sep. 7, 2011, for U.S. Appl. No. 11/849,197, filed Aug. 31, 2007 by M.S. Davis et al., Total 17 pp. [57.110 (FOA1)].

Office Action 3, Feb. 2, 2012, for U.S. Appl. No. 11/849,197, filed Aug. 31, 2007 by M.S. Davis et al., Total 22 pp. [57.110 (OA3)].

Final Office Action 1, Feb. 21, 2012, for U.S. Appl. No. 11/849,187, filed Aug. 31, 2007 by M.S. Davis et al., Total 20 pp. [57.109 (FOA1)].

Amendment 1, Dec. 2, 2011, for U.S. Appl. No. 11/849,187, filed Aug. 31, 2007 by M.S. Davis et al., Total 13 pp. [57.109 (Amend1)].

Amendment 2, May 1, 2012, for U.S. Appl. No. 11/849,187, filed Aug. 31, 2007 by M.S. Davis et al., Total 13 pp. [57.109 (Amend2)].

Amendment 1, Jun. 9, 2011, for U.S. Appl. No. 11/849,197, filed Aug. 31, 2007 by M.S. Davis et al., Total 14 pp. [57.110 (Amend1)].

Amendment 2, Oct. 26, 2011, for U.S. Appl. No. 11/849,197, filed Aug. 31, 2007 by M.S. Davis et al., Total 17 pp. [57.110 (Amend2)].

Amendment 3, May 2, 2012, for U.S. Appl. No. 11/849,197, filed Aug. 31, 2007 by M.S. Davis et al., Total 18 pp. [57.110 (Amend3)].

Notice of Allowance 1, Sep. 4, 2012, for U.S. Appl. No. 11/849,197, filed Aug. 31, 2007 by M.S. Davis et al., Total 21 pp. [57.110 (NOA1)].

Notice of Allowance, Oct. 16, 2012, for U.S. Appl. No. 11/849,187, filed Aug. 31, 2007 by M.S. Davis et al., Total 18 pp. [57.109 (NOA)].

Supplemental Notice of Allowability, Dec. 6, 2012, for U.S. Appl. No. 11/849,197, filed Aug. 31, 2007 by M.S. Davis et al., Total 6 pp. [57.110 (SuppNtcAllowability)].

Supplemental Notice of Allowability, Dec. 7, 2012, for U.S. Appl. No. 11/849,187, filed Aug. 31, 2007 by M.S. Davis et al., Total 11 pp. [57.109 (SuppNtcAllowability)].

Office Action 1 for U.S. Appl. No. 13/776,633, dated Oct. 24, 2013, 25 pp.

Notice of Appeal and Pre-Appeal Conference Request for U.S. Appl. No. 13/776,633, dated Jan. 24, 2014, 8 pp.

* cited by examiner

UPDATING A WORKFLOW WHEN A USER REACHES AN IMPASSE IN THE WORKFLOW

CROSS-REFERENCE TO RELATED APPLICATION

This application is a continuation of U.S. patent application Ser. No. 11/849,187, filed on Aug. 31, 2007, which application is incorporated herein by reference in its entirety.

FIELD

The present invention relates to a method, system, and article of manufacture for updating a workflow when a user reaches an impasse in the workflow.

DESCRIPTION OF THE RELATED ART

A workflow defines a series of processes to be performed by one or more users at client computers. The user activities at the client computers may involve updating an electronic form, reviewing information, troubleshooting a technical program with a device, program or other problem, entering input, executing a program, etc. After a user performs a specified action at a node in the workflow, the workflow program, or workflow engine, may traverse to a next node in the workflow based on the input the user supplied. The workflow may specify that a same or different user perform operations at a next node in the workflow.

For users traversing a workflow, there exists the potential for the user to reach an impasse where the workflow does not account for the particular needs of the user's particular situation. Upon reaching an impasse, the user may access an updated workflow over a network and download the revised workflow. This requires the user to exit the workflow, download the new workflow, and update the workflow with the new workflow. However, the user cannot be assured that the new workflow addresses the reasons for the user's particular impasse.

The user may also access and run the workflow over a network, so that the user is accessing the most current version of the workflow. This solution requires that the user work on-line to access the workflow.

There is a need in the art for improved techniques for updating a workflow.

SUMMARY

Provided are a method, system, and article of manufacture for updating a workflow when a user reaches an impasse in the workflow. A workflow program processes user input at a current node in a workflow comprised of nodes and workflow paths connecting the nodes, and wherein the user provides user input to traverse through at least one workflow path to reach the current node. The workflow program processes user input at the current node to determine whether there is a next node in the workflow for the processed user input. The workflow program transmits information on the current node to an analyzer in response to determining that there is no next node in the workflow. The analyzer processes the information on the current node to determine whether there are modifications to the current node. The analyzer transmits to the workflow program an update including the determined modifications to the current node in response to determining the modification.

DETAILED DESCRIPTION

Figure 1:
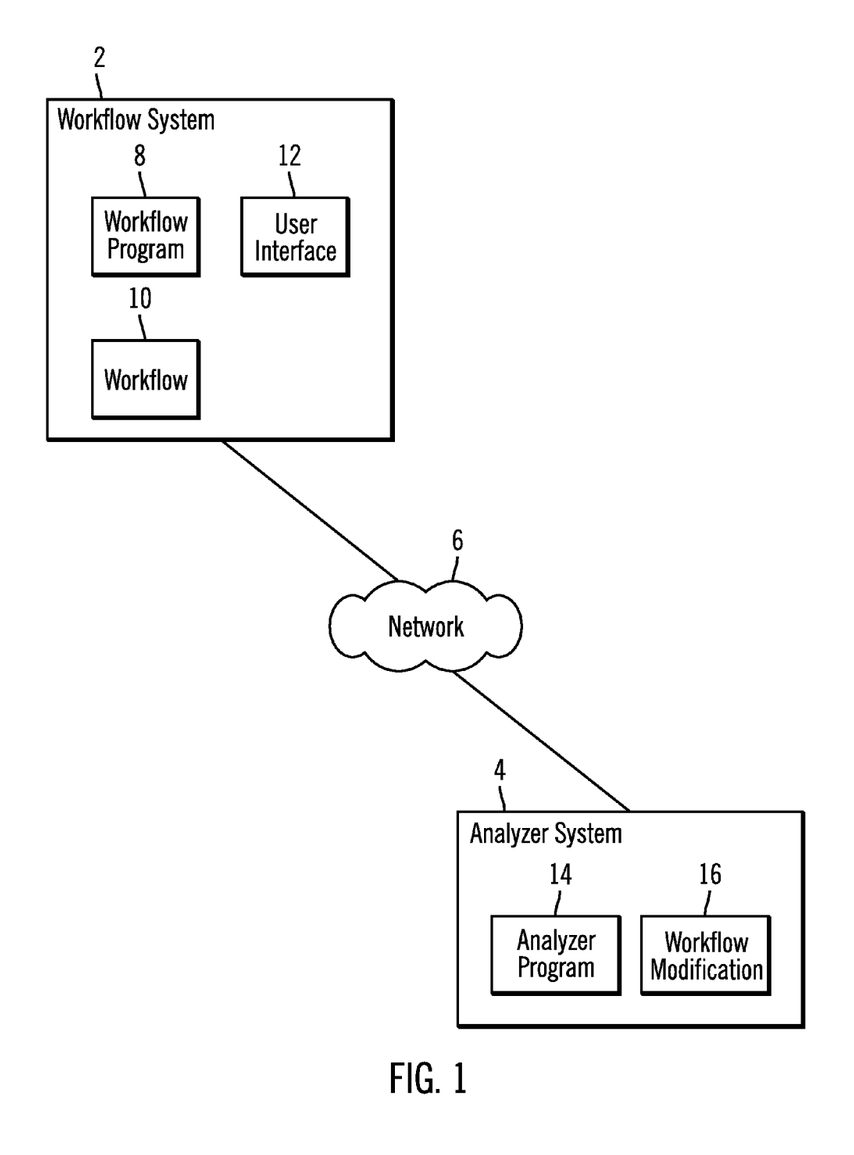
FIG. 1 illustrates an embodiment of a computing environment.

FIG. 1 illustrates a computing environment in which embodiments may be implemented. A workflow system 2 is in communication with an analyzer system 4 over a network 6. The workflow system 2 includes a workflow program 8, such as a workflow engine, that processes a workflow 10 to interpret and execute the process defined by the workflow 10. The workflow 10 comprises a plurality of nodes, where user input to perform an operation at a node determines the transition to a subsequent node in the workflow to perform further operations or obtain information. The workflow program 8 generates a user interface 12 to display information on the workflow and receive user input at a node in the workflow which may determine the workflow path defined in the workflow 10 that the workflow program 8 selects to transition to a next node, which may have yet further transitions to additional nodes or define an exit or final node of the workflow.

The workflow 10 may define a process to diagnose a technical problem with a device or program, or to perform an operation to implement a business process, such as enter customer information, process a sales order, process a customer request, etc. The operations performed at nodes in the workflow may be performed by workflow participants at client computers in a network environment or by one user. One or more actions and a user may be associated with the work nodes in the workflow. The work nodes defined for the workflow may comprise a decision point node, collection point node, document node, and assign value node. A decision point node causes the workflow to proceed along a branch of execution based on selection by the user or some other action taken by an external application called at a previous work node. For instance, the path taken to the next node in the workflow may vary depending on the user input. At a node, the user may perform various operations, such as enter input, invoke a program, create or revise a document, etc. The input the user provides or output generated at a node may determine the workflow path transition to a next node.

If the workflow program 8 processes a node or point in the workflow 10 at which there is an impasse comprising no acceptable further choice available to the user, then the workflow program 8 may communicate with the analyzer program 14 over the network 6. The analyzer program 14 determines whether there are any modifications 16 to the workflow 10 that may be applicable to the impasse the user of the workflow program 8 is experiencing. The modifications 16 comprise changes to nodes in the workflow 10, which may comprise modifications in later versions of the workflow 10 the workflow program 8 is processing.

Figure 2:
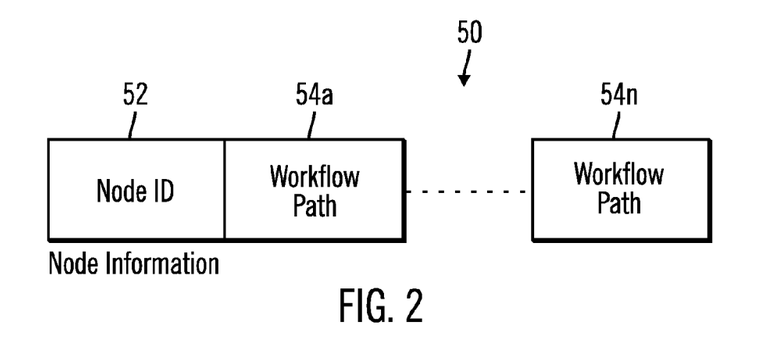
FIG. 2 illustrates an embodiment of node information.

FIG. 2 illustrates an embodiment of node information 50 maintained for the nodes in the workflow 50. The node information 50 for one node may include a node identifier 52 and one or more workflow paths 54a . . . 54n defining transitions to next nodes in the workflow 10.

Figure 3:
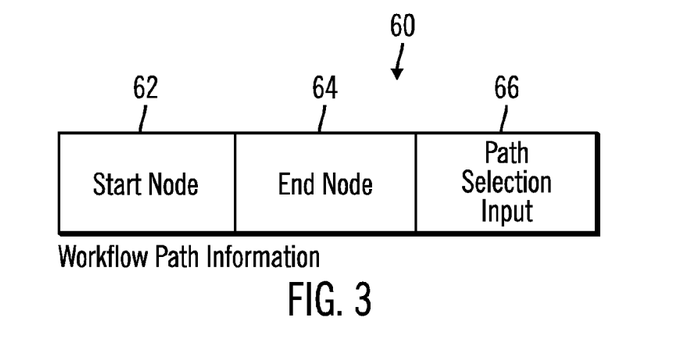
FIG. 3 illustrates an embodiment of workflow path information.

FIG. 3 illustrates an embodiment of workflow path information 60 provided for the workflow paths 54a . . . 54n defined for one node 50, which may include a start node 62 indicating the node from which the path extends and an end node 64 comprising the node to which the path transitions. Path selection input 66 indicates the user input that causes the transition from the start node 62 to the end node 64. Thus, if a node 50 is defined to include multiple workflow paths 54a . . . 54n, then the user input is compared to the path selection input 66 to determine the workflow path 54a . . . 54n used for the transition to the end node 64 of the determined workflow path 60.

The node information described with respect to FIGS. 2 and 3 may be arranged and organized in a different manner in a workflow 10 than shown in FIGS. 2 and 3.

Figure 4:
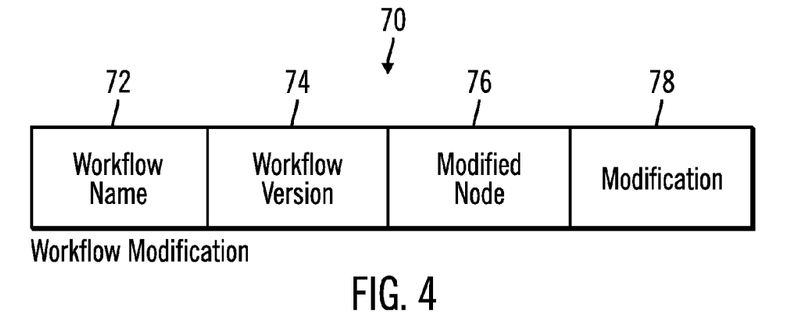
FIG. 4 illustrates an embodiment of a workflow modification.

FIG. 4 illustrates an embodiment of a workflow modification 70, where the workflow modification 16 may be comprised of a plurality of workflow modification 70 instances. The workflow modification 70 information may include a workflow name 72 and a workflow version 74 which includes the modification; the modified node 76 affected by the modification; and the modification 78. The modifications 78 may comprise one or more new nodes and workflow paths at the node 76, a modified workflow path at the node 76, a deletion of a workflow path at the node, different information to present at the node 76, different operations to perform at the node, etc.

Figure 5:
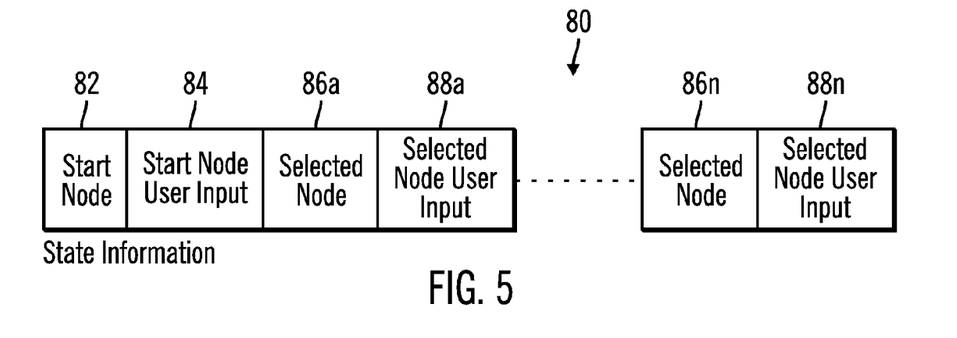
FIG. 5 illustrates an embodiment of state information.

FIG. 5 illustrates an embodiment of state information 80 the workflow program 8 maintains and sends to the analyzer program 14 in the event of reaching an impasse. The state information 80 may include a start node 82 of the workflow at which the workflow 10 was invoked, user input 84 at the start node, one or more selected nodes 86a . . . 86n to which the user transitioned, which may include the node ID 52 (FIG. 2), and the user input at each selected node 88a . . . 88n the user provided at the selected node to transition to a next node.

Figure 6:
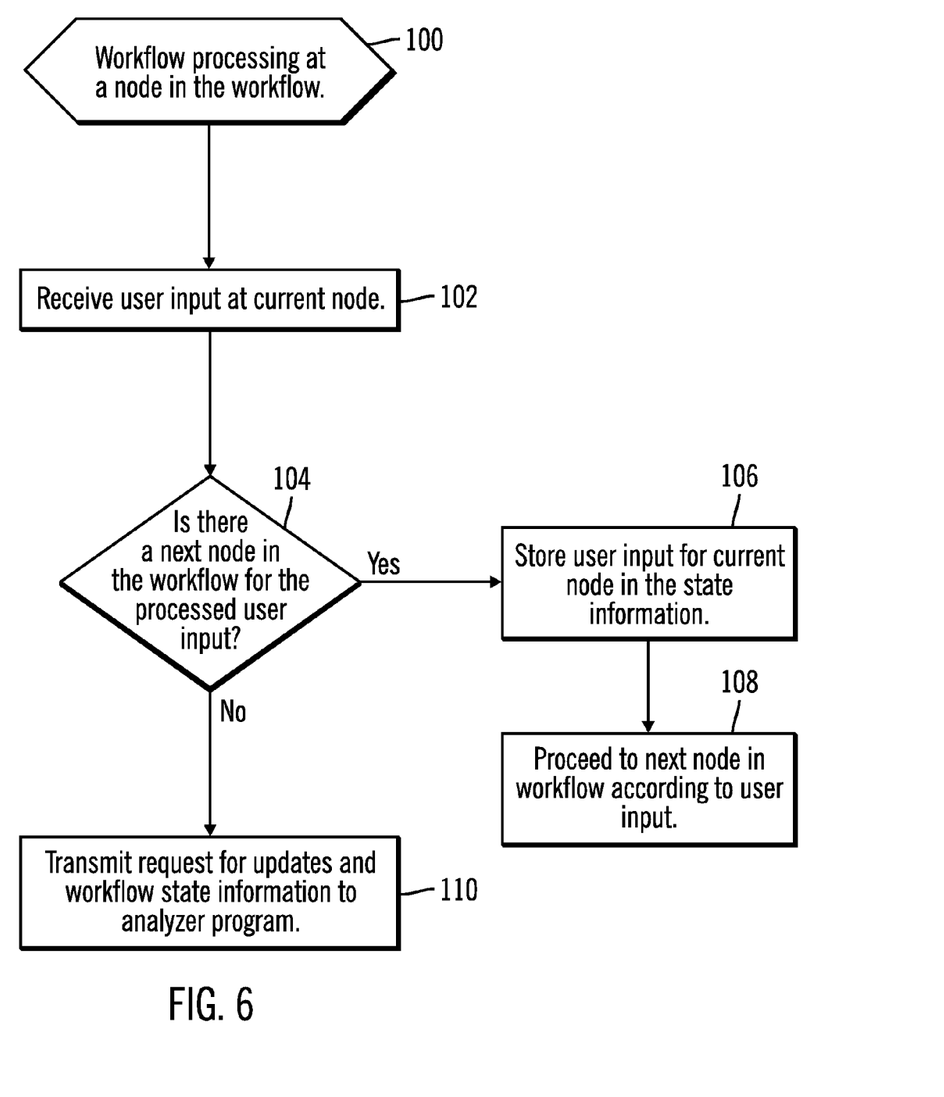
FIG. 6 illustrates an embodiment of operations to process a workflow at a node.

FIG. 6 illustrates an embodiment of operations performed by the workflow program 8 to process user input at a node. Upon processing (at block 100) a node in the workflow 10 and receiving (at block 102) user input at the node, the workflow program 8 determines (at block 104) whether there is a next node in the workflow 10 for the processed user input. This operation may involve determining whether the received user input matches the path selection input 66 (FIG. 3) for one workflow path 54a . . . 54n for the current node. User input may be in the form of entered text information or selection of rendered selection options, where one selection option may indicate no valid option or choice. If (at block 104) there is a next node corresponding to the received user input, e.g., having corresponding path selection input 66, then the workflow program 8 stores (at block 106) the entered user input for the current node in the state information 80 in the selected node 86n and selected node user input 88n. The workflow program 6 proceeds (at block 108) to the next node in the workflow, which may comprise the end node 64 in the workflow path information 54a . . . 54n for the current node whose path selection input 66 matches the received user input.

If (at block 104) there is not a next node corresponding to the received user input or the user has selected an option indicating an impasse or no acceptable option, then the workflow program 8 transmits (at block 110) a request for updates and workflow state information 80 (FIG. 5) to the analyzer program 14, which may include information on the current node and received user input at which the impasse occurred.

Figure 7:
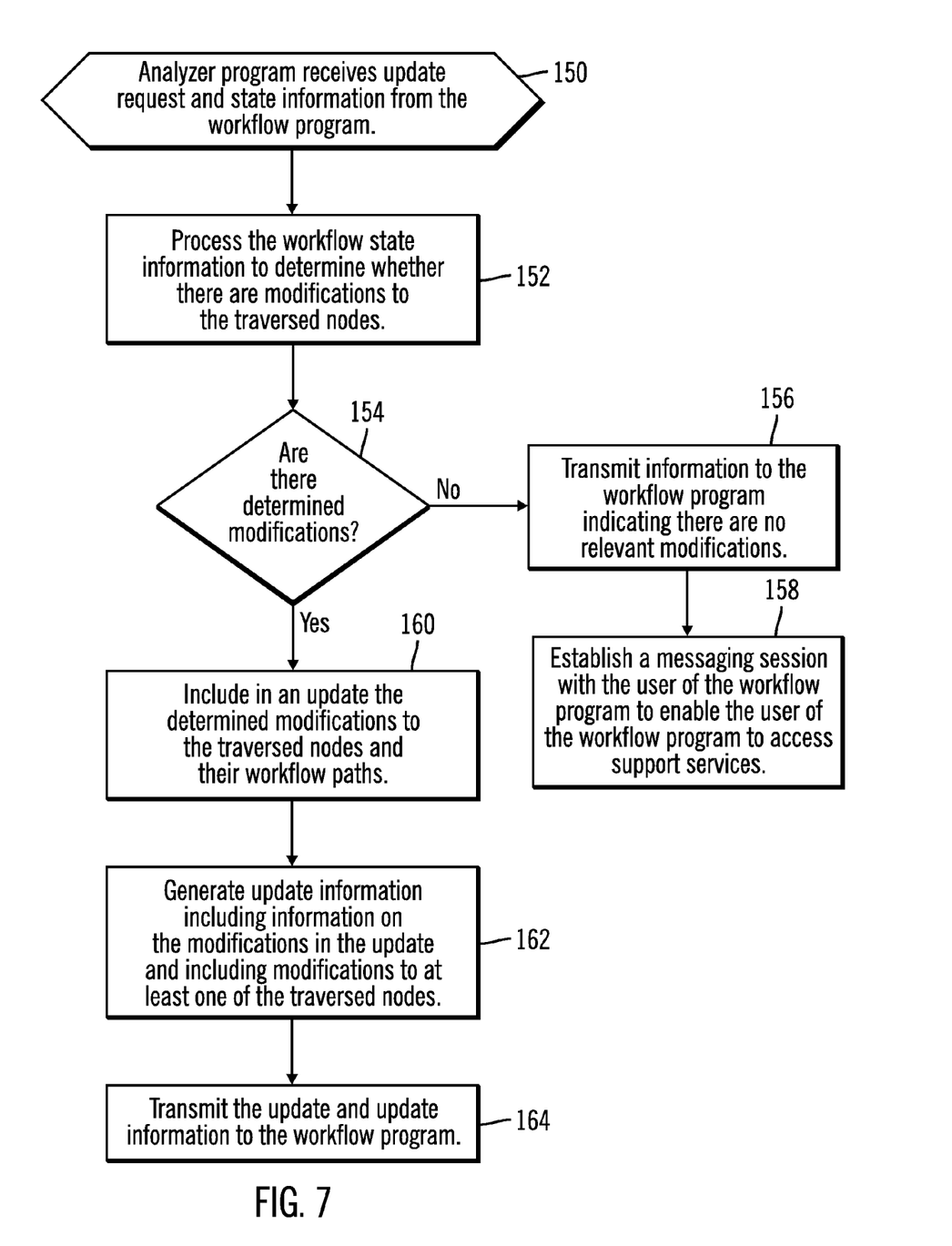
FIGS. 7 and 8 illustrate embodiments of operations to process an update request and state information.

FIG. 7 illustrates an embodiment of operations the analyzer program 14 performs to determine whether there are workflow modifications 16 applicable to the impasse the user of the workflow program 8 has reached. Upon receiving (at block 150) an update request and state information 80 (FIG. 5) from the workflow program 8, where the analyzer program 14 may receive update requests from workflow programs on different workflow systems 2 in the network 6, the analyzer program 14 processes (at block 152) the received workflow state information 80 (FIG. 5) to determine whether there are modifications 70 in the workflow modifications 16 to one or more of the traversed nodes 82, 86a . . . 86n (FIG. 5), such as the current node and/or at least one of the previous nodes the user traversed. A modification 70 may be determined if the modified node 76 in one modification 70 matches one of the traversed nodes. If (at block 154) there are no determined modifications 70 for the nodes 82, 86a . . . 86n the user traversed, then the analyzer program 14 transmits (at block 156) information to the workflow program 8 indicating there are no relevant modifications in the workflow modifications 16 that could avoid the impasse at the current node. In one embodiment, the analyzer program 14 may initiate an operation to establish (at block 158) an assistance session between a support center and the user of the workflow program 8 to enable the user of the workflow program 8 to communicate with support services. The support services may comprise a web site providing frequently accessed questions and other technical support information the user may search and access. The support services may also comprise a messaging session with a technical support representative to assist the user.

If (at block 154) there are determined modifications 70 that relate to the nodes the user has traversed, then the analyzer program 14 includes (at block 160) in an update the determined modifications to the traversed nodes and their workflow paths. The analyzer program 14 may further generate (at block 162) update information including information on the modifications in the update and including modifications to at least one of the previous nodes the user traversed to reach the current node. The update including modifications and update information are transmitted (at block 164) to the workflow program 8.

Figure 8:
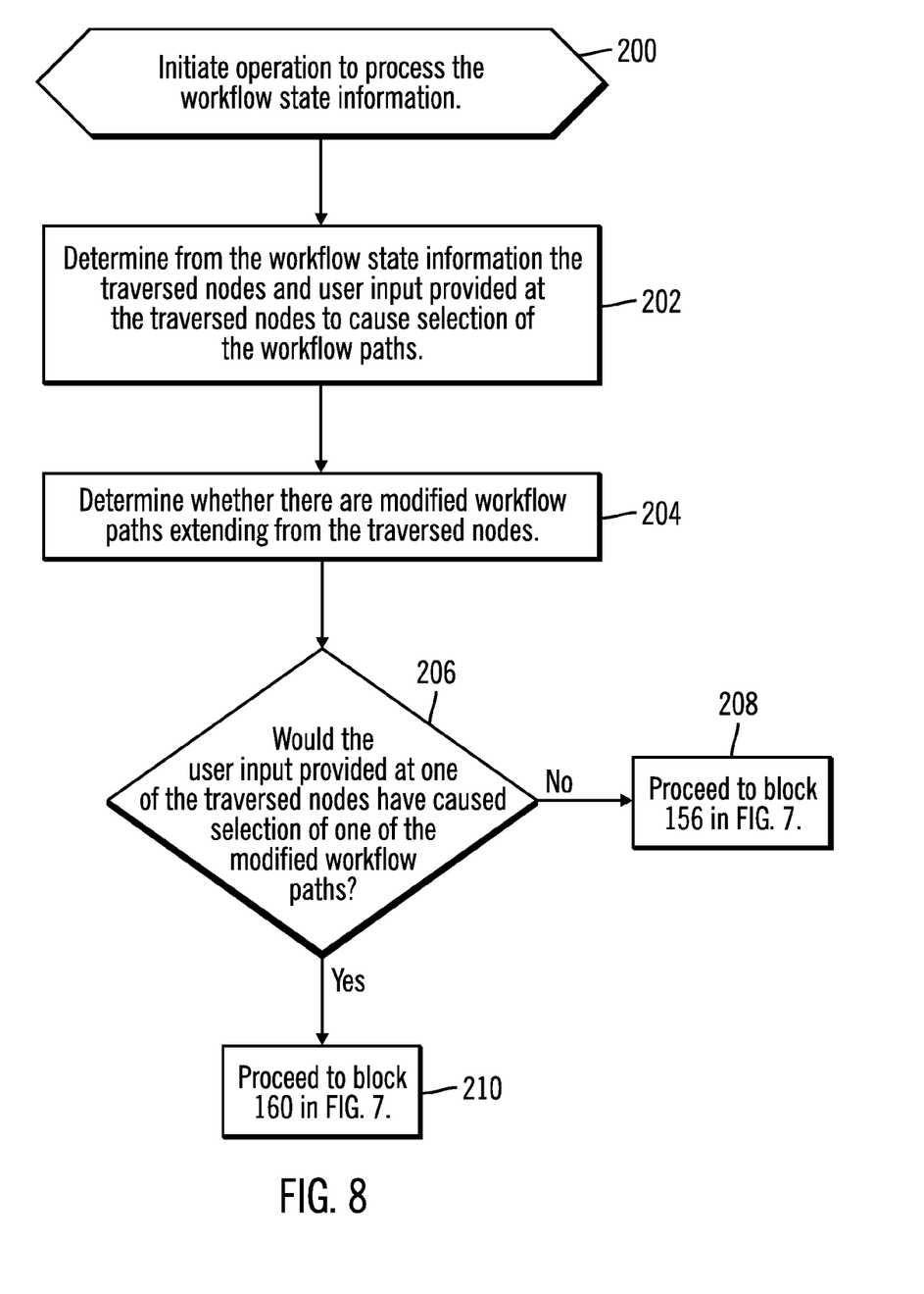

FIG. 8 illustrates an alternative embodiment of operations performed by the analyzer program 14 to determine modifications 16 to send to the workflow program 8 to use to update the workflow 10. Upon initiating (at block 200) operations to process the workflow state information 80, the analyzer program 14 determines (at block 202) from the workflow state information 50 the node traversed 82, 86a . . . 86n and user input 84, 88a . . . 88n provided at the previous nodes to cause selection of the workflow paths leading to the traversed nodes. The analyzer program 14 may then determine (at block 204) whether there are modified workflow paths extending from one of the traversed nodes 82, 86a . . . 86n. A modified workflow path may comprise a new workflow path or altered workflow path at a node. The analyzer program 14 further determines (at block 206) whether the user input 84, 88a . . . 88n (FIG. 5) provided at one of the traversed nodes 82, 86a . . . 86n would have caused selection of one of the determined modified workflow paths, which could have caused a change in the nodes the user traversed. If (at block 206) there are no modified paths that the user input 84, 86a . . . 86n (FIG. 5) could have selected, then control proceeds (at block 208) to block 156 in FIG. 7 to not transmit updates to the workflow program 8. If (at block 206) there are modifications to workflow paths that the user input 84, 88a . . . 88n could have selected, then the analyzer program 14 proceeds (at block 210) to block 160 in FIG. 6 to transmit in an update the information on the determined modified nodes and workflow paths that could have been selected according to the received user input 84, 88*a* . . . 88*n*.

Figure 9:
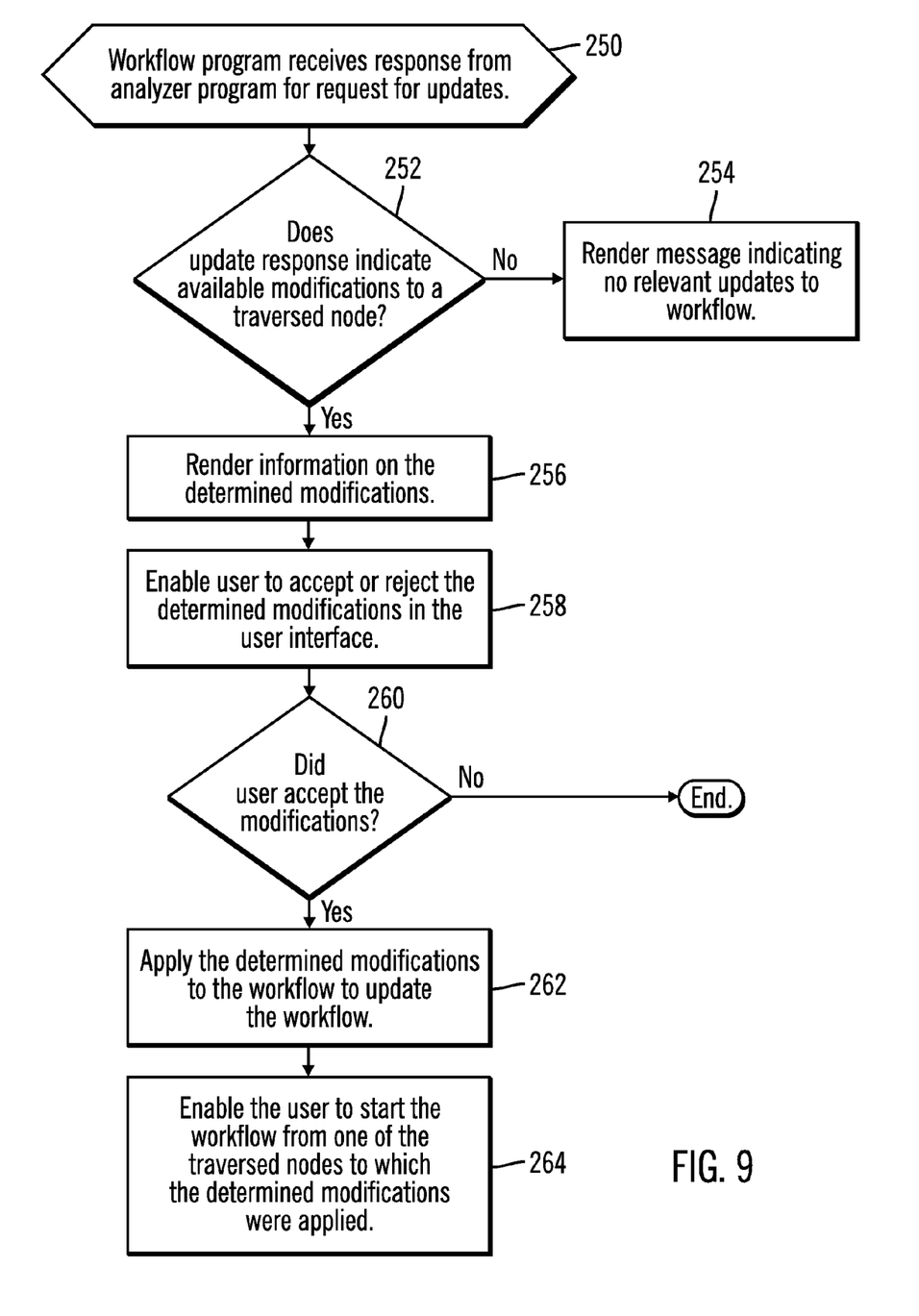
FIG. 9 illustrates an embodiment of operations to process received modifications to a workflow.

FIG. 9 illustrates an embodiment of operations performed by the workflow program 8 in response to receiving updates or other information from the analyzer program 14. Upon the workflow program 8 receiving (at block 250) a response from the analyzer program 14 to the request for updates, the workflow program 8 determines (at block 252) whether the update response indicates available modifications to the traversed nodes. If (at block 250) there are no modifications, then the workflow program 8 may render (at block 254) a message in the user interface 12 indicating no relevant updates to the workflow 10. If (at block 250) there are potentially applicable modifications, then the workflow program 8 renders (at block 256) information on the determined modifications in the user interface 12. The workflow program 8 enables (at block 258) the user to accept or reject the determined modifications in the user interface 12.

If (at block 260) the user does not accept the modifications, indicating the user does not believe the modifications address the reasons for the impasse, then control ends. Otherwise, if the user indicates acceptance of the received modifications, then the workflow program 8 applies (at block 262) the determined modifications 70 to the workflow 10 to update the workflow 10 and enables (at block 264) the user to start the workflow 10 from one of the traversed nodes to which the determined modifications were applied.

With the described embodiments, if a user reaches an impasse at a node in a workflow program, then the workflow program may automatically communicate with an analyzer program to determine whether there are any modifications relevant to the nodes the user has traversed that could allow the user to overcome the impasse. If the analyzer program determines modifications that could potentially overcome the impasse, such as modifications related to the nodes and paths the user traversed and the user input at the traversed nodes, then the analyzer program may provide such modifications to the workflow program to apply and to update the workflow.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, the workflow program 8 may transmit state information on all nodes the user has traversed and/or user input at the traversed nodes. In an alternative embodiment, the workflow program 8 may transmit state information on only one or less than all nodes traversed. For instance, the workflow program may only transmit information on the current node to determine if there are updates to the current node.

Figure 10:
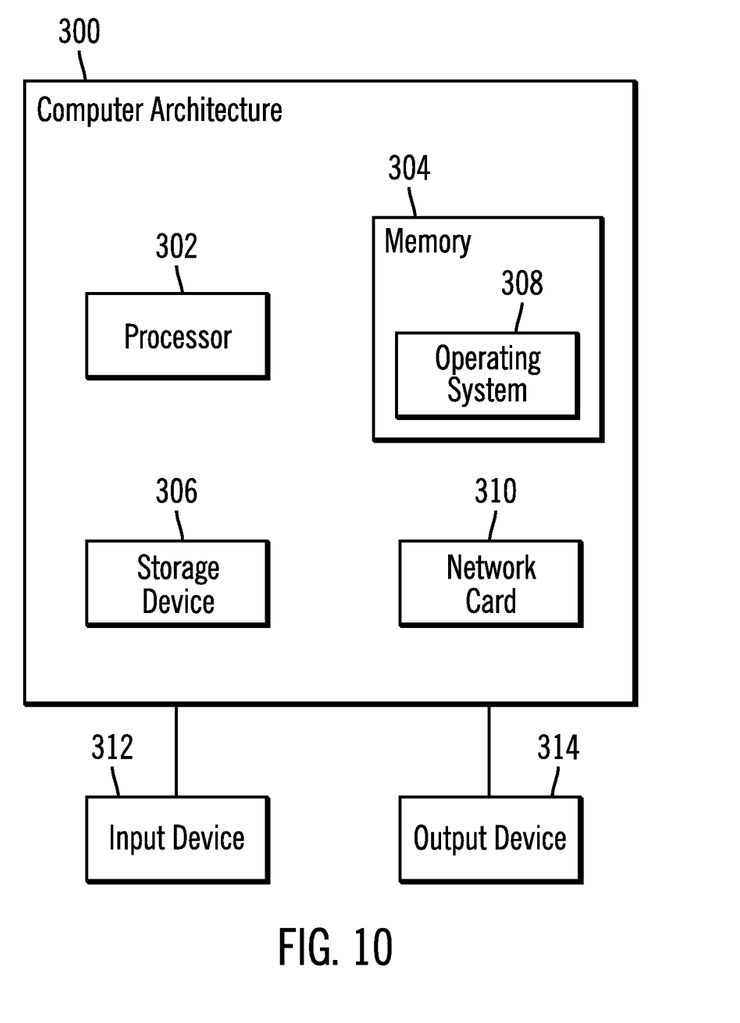
FIG. 10 illustrates an embodiment of a computer architecture that may be used with the system in FIG. 1.

FIG. 10 illustrates one implementation of a computer architecture 300 that may be implemented in the workflow 2 and analyzer 4 systems of FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308, device drivers and application programs, in the storage 306 are loaded into the memory 304 and executed by the processor 302 in a manner known in the art. The architecture further includes a network card 310 to enable communication with a network. An input device 312 is used to provide user input to the processor 312, and may include a keyboard, mouse, pen-stylus, microphone, touch sensitive display screen, or any other activation or input mechanism known in the art. An output device 314 is capable of rendering information transmitted from the processor 312, or other component, such as a display monitor, printer, storage, etc.

The network 6 may comprise a Wide Area Network (WAN), Local Area Network (LAN), Storage Area Network (SAN), wireless network, the Internet, an Intranet, peer-to-peer network, etc. Alternatively, the systems 2 and 4 may be connected via a direct cable.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6, 7, 8, and 9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a non-transitory computer readable storage medium including code implementing a workflow program and analyzer to cause operations to be performed by the workflow program and the analyzer, the operations comprising:

processing, by the workflow program, current user input received at a current node in a workflow comprised of nodes and workflow paths connecting the nodes, and wherein the user provided previous user input to traverse through at least one workflow path to reach the current node;

processing, by the workflow program, the current user input at the current node to determine whether there is a next node in the workflow for the processed user input;

transmitting, by the workflow program, information on the current node, including information on the current user input at the current node, to the analyzer in response to determining that there is no next node in the workflow, wherein no next node is determined when there is an impasse at the current node at which there is no next node in the workflow for the current user input provided at the current node;

processing, by the analyzer, the information on the current node to determine whether there are modifications to the current node;

transmitting to the workflow program, by the analyzer, an update including the determined modifications to the current node in response to determining the modification; and transmitting, by the analyzer, information to the workflow program to notify the user that the update modifies at least one of the traversed nodes in response to determining that the update provides at least one update to at least one of the traversed nodes indicated in a workflow state indicating nodes traversed by the user.

2. The article of manufacture of claim 1, wherein the update modifies at least one workflow path extending from the current node in the workflow.

3. The article of manufacture of claim 1, wherein the operations further comprise:

maintaining, by the workflow program, the workflow state indicating the nodes traversed by the user;

transmitting, by the workflow program, the workflow state to the analyzer in response to determining that there is no next node; and processing, by the analyzer, the workflow state with the information on traversed nodes comprising nodes traversed by the user to determine whether there are modifications to at least one of the traversed nodes, wherein the update includes the determined modifications.

4. The article of manufacture of claim 3, wherein determining whether there are modifications comprises determining whether there is a modification to at least one workflow path extending from at least one of the traversed nodes, wherein the transmitted update includes the determined modifications to the workflow paths.

5. The article of manufacture of claim 3, wherein no update including modifications to the workflow is transmitted to the workflow program in response to determining that there are no modifications for at least one of the traversed nodes.

6. The article of manufacture of claim 5, wherein the operations further comprise:

establishing a support session between the user of the workflow program and support services to enable the user of the workflow program to access support services in response to determining that that there is no modification to at least one of the traversed nodes.

7. The article of manufacture of claim 1, wherein the operations further comprise:

transmitting, by the analyzer, the workflow program information on the determined modifications;

enabling, by the workflow program, the user to accept or reject the determined modifications;

applying, by the workflow program, the determined modifications to the workflow to update the workflow in response to the user indicating to accept the determined modifications; and enabling, by the workflow program, the user to start the workflow from one of the traversed nodes to which the determined modifications were applied.

8. A system, comprising:
a non-transitory computer readable storage medium including a workflow comprised of nodes and workflow paths connecting the nodes;
an analyzer program;
a workflow program enabled to perform operations, the operations including:
processing current user input received at a current node in the workflow, wherein the user provided previous user input to traverse through at least one workflow path to reach the current node;
processing the current user input at the current node to determine whether there is a next node in the workflow for the processed user input;
transmitting information on the current node, including information on the current user input at the current node, to the analyzer program in response to determining that there is no next node in the workflow, wherein no next node is determined when there is an impasse at the current node at which there is no next node in the workflow for the current user input provided at the current node;
wherein the analyzer program is enabled to perform operations, the operations including:
processing the information on the current node to determine whether there are modifications to the current node;
transmitting to the workflow program an update to the workflow program including the determined modifications to the current node in response to determining the modification; and
transmitting information to the workflow program to notify the user that the update modifies at least one of the traversed nodes in response to determining that the update provides at least one update to at least one of the traversed nodes indicated in a workflow state indicating nodes traversed by the user.

9. The system of claim 8, wherein the update modifies at least one workflow path extending from the current node in the workflow.

10. The system of claim 8,
wherein the workflow program operations further comprise:
maintaining the workflow state indicating the nodes traversed by the user;
transmitting the workflow state to the analyzer in response to determining that there is no next node; and
wherein the analyzer program operations further comprise:
processing the workflow state with the information on traversed nodes comprising nodes traversed by the user to determine whether there are modifications to at least one of the traversed nodes, wherein the update includes the determined modifications.

11. The system of claim 10, wherein determining whether there are modifications comprises determining whether there is a modification to at least one workflow path extending from at least one of the traversed nodes, wherein the transmitted update includes the determined modifications to the workflow paths.

12. The system of claim 8,
wherein the analyzer program operations further comprise:
transmitting to the workflow program the workflow program information on the determined modifications;
wherein the workflow program operations further comprise:
enabling the user to accept or reject the determined modifications;
applying the determined modifications to the workflow to update the workflow in response to the user indicating to accept the determined modifications; and
enabling, by the workflow program, the user to start the workflow from one of the traversed nodes to which the determined modifications were applied.

13. A method, comprising:
processing, by a workflow program, current user input received at a current node in a workflow comprised of nodes and workflow paths connecting the nodes, and wherein the user provided previous user input to traverse through at least one workflow path to reach the current node;
processing, by the workflow program, the current user input received at the current node to determine whether there is a next node in the workflow for the processed user input;
transmitting, by the workflow program, information on the current node, including information on the current user input at the current node, to an analyzer in response to determining that there is no next node in the workflow, wherein no next node is determined when there is an impasse at the current node at which there is no next node in the workflow for the current user input provided at the current node;
processing, by the analyzer, the information on the current node to determine whether there are modifications to the current node;
transmitting to the workflow program, by the analyzer, an update including the determined modifications to the current node in response to determining the modification; and
transmitting, by the analyzer, information to the workflow program to notify the user that the update modifies at least one of the traversed nodes in response to determining that the update provides at least one update to at least one of the traversed nodes indicated in a workflow state indicating nodes traversed by the user.

14. The method of claim 13, wherein the update modifies at least one workflow path extending from the current node in the workflow.

15. The method of claim 13, further comprising:
maintaining, by the workflow program, the workflow state indicating the nodes traversed by the user;
transmitting, by the workflow program, the workflow state to the analyzer in response to determining that there is no next node; and
processing, by the analyzer, the workflow state with the information on traversed nodes comprising nodes traversed by the user to determine whether there are modifications to at least one of the traversed nodes, wherein the update includes the determined modifications.

16. The method of claim 15, wherein determining whether there are modifications comprises determining whether there is a modification to at least one workflow path extending from at least one of the traversed nodes, wherein the transmitted update includes the determined modifications to the workflow paths.

* * * * *